M. H. HARTER.
FLEXIBLE POWER TRANSMISSION MECHANISM.
APPLICATION FILED JAN. 2, 1919.

1,330,869.

Patented Feb. 17, 1920.
2 SHEETS—SHEET 1.

Inventor
Marion H. Harter
By his Attorneys
Williamson & Merchant

M. H. HARTER.
FLEXIBLE POWER TRANSMISSION MECHANISM.
APPLICATION FILED JAN. 2, 1919.
1,330,869.
Patented Feb. 17, 1920.
2 SHEETS—SHEET 2.
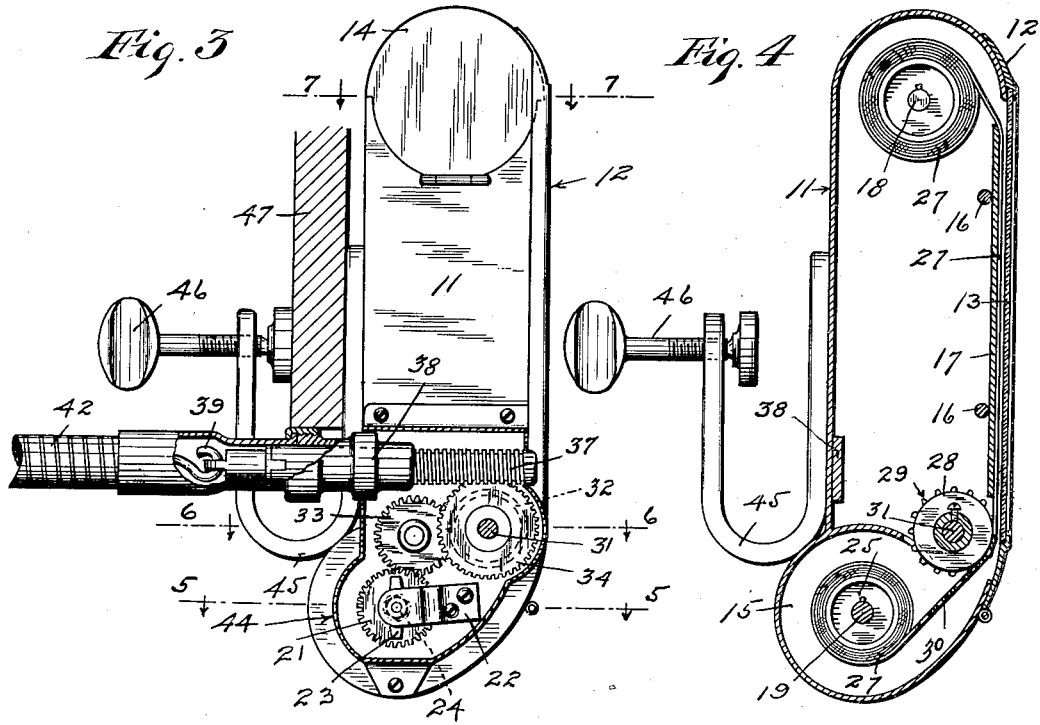
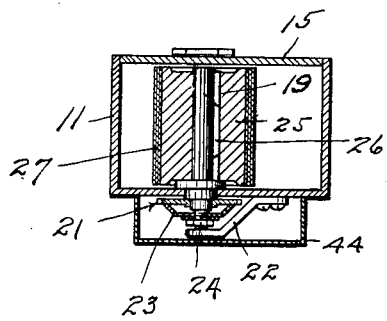
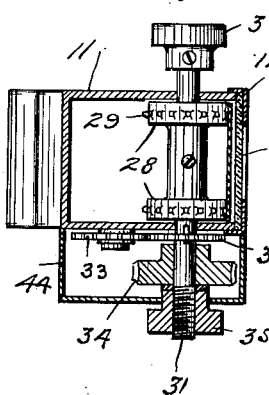
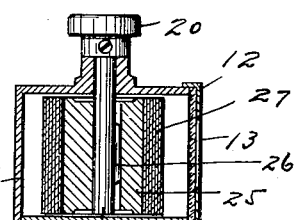
Inventor
Marion H. Harter
By his Attorneys

UNITED STATES PATENT OFFICE.

MARION H. HARTER, OF MINNEAPOLIS, MINNESOTA, ASSIGNOR TO HARTER MANUFACTURING COMPANY, OF MINNEAPOLIS, MINNESOTA, A COPARTNERSHIP CONSISTING OF ORLIE H. DUTTON, DELFORD D. MERCHANT, WILLIAM H. FOLLETTE, AND MARION H. HARTER.

FLEXIBLE POWER-TRANSMISSION MECHANISM.

1,330,869.  Specification of Letters Patent.  Patented Feb. 17, 1920.

Application filed January 2, 1919. Serial No. 269,287.

*To all whom it may concern:*

Be it known that I, MARION H. HARTER, a citizen of the United States, residing at Minneapolis, in the county of Hennepin and State of Minnesota, have invented certain new and useful Improvements in Flexible Power-Transmission Mechanism; and I do hereby declare the following to be a full, clear, and exact description of the invention, such as will enable others skilled in the art to which it appertains to make and use the same.

My invention relates to improvements in flexible power transmission mechanism especially adapted for operating route guides for vehicles directly from a driven part of a speedometer or the driving shaft thereof, thus avoiding an extra set of driving connections from one of the wheels of a vehicle or from the propeller shaft of its motor for operating said route guide.

To the above end, generally stated, the invention consists of the novel devices and combinations of devices hereinafter described and defined in the claim.

In the accompanying drawings, which illustrate the invention, like characters indicate like parts throughout the several views.

Referring to the drawings,

Fig. 3 is a view principally in side elevation with some parts sectioned on the line 3—3 of Fig. 1;

Fig. 4 is a view partly in side elevation and partly in section taken on the line 4—4 of Fig. 1;

Fig. 5 is a transverse section taken on the line 5—5 of Fig. 3;

Fig. 6 is a transverse section taken on the line 6—6 of Fig. 3; and

Fig. 7 is a transverse section taken on the line 7—7 of Fig. 3.

Figure 1:
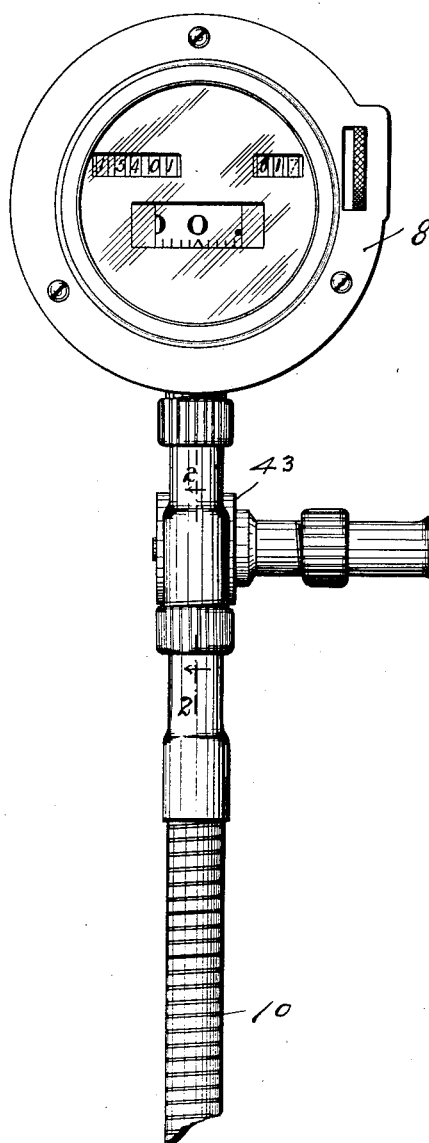
Figure 1 is a front elevation showing the invention attached to the flexible driving shaft of a speedometer.
Figure 2:
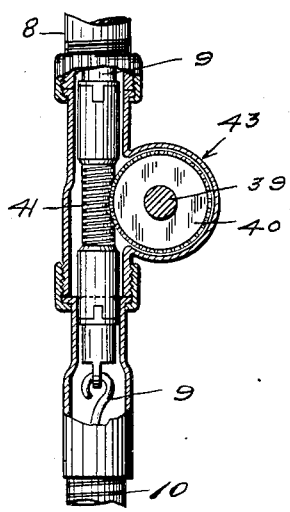
Fig. 2 is a detail view partly in elevation and partly in section taken on the line 2—2 of Fig. 1.
Figure 2:
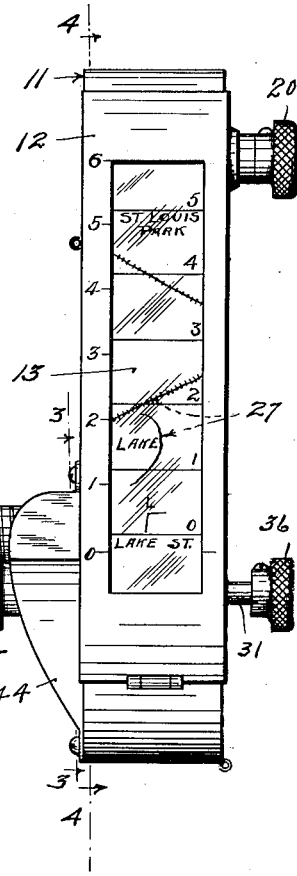

The numeral 8 indicates, as an entirety, a speedometer, which may be of any well known construction, and the numeral 9 indicates the flexible driving shaft therefor, mounted in a flexible casing 10. The flexible driving shaft 9 is driven by suitable connections from the front wheel or propeller shaft of a motor-driven vehicle, not shown.

The numeral 11 indicates a casing having an open front normally closed by a door 12 hinged at its lower end to said casing, so as to swing downward when opened. This door 12 has side flanges, which embrace the sides of the casing 11 and is provided with a glass panel 13 that affords a sight opening in said casing. A suitable catch, not shown, may be provided for securing the door 12 in a closed position. In the left-hand side of the casing 11, at the top thereof, is a substantially annular door opening normally closed by a door 14, and, in the right-hand side of said casing, is a similar door opening normally closed by a door 15. Both doors 14 and 15 are hinged at their lower edges so as to swing downward, when opened, and the door openings closed thereby afford access to the interior of the casing 11. As shown, the doors 14 and 15 are held closed by the overlapping flanges of the door 12 or, if desired, separate catches may be provided therefor. The two sides of the casing 11 are connected by a pair of longitudinally spaced screws 16, on which is removably supported a table top 17 underlying the glass door panel 13 and spaced inward thereof to afford a narrow passageway therebetween. By tightening the screw 16, the sides of the casing 11 are drawn onto the longitudinal edges of the table 17, and thereby frictionally hold the same in position.

Within the casing 11, is an upper spindle 18 and a lower spindle 19 located in axial alinement with the door openings normally closed by the doors 14 and 15, respectively. The upper spindle 18, at its left-hand end, is journaled in a bossed opening in the left-hand side of the casing 11 and has secured thereto, outward of said casing, a knob 20 by which said spindle may be turned in either direction. The other or lower spindle 19 is journaled at its right-hand end in the right-hand side of the casing 11, and, outward of said casing, has loosely journaled thereon a gear 21. The spindle 19, outward of the gear 21, is reduced and journaled in a bracket 22 secured to the casing 11. A pair of integrally formed spring fingers 23 have, at their connected inner ends, an aperture through which the reduced outer end of the spindle 19 projects. These fingers 23 bear upon the gear 21, at diametrically opposite points, and are pressed thereagainst under a variable pressure by a set nut 24 having screw-threaded engagement with the reduced end of the spindle 19. Normally these spring fingers 23 cause the spindle 19 to rotate with the gear 21, but under undue strain on said spindle, will permit the same to slip in respect to the gear, as will presently appear. Removably mounted on each spindle 18 and 19, is a spool 25 held against removal therefrom by the doors 14 and 15. These spools 25 are held for rotation with the spindles 18 and 19 by keys 26, which extend in key seats formed in said spools.

Wound on the upper spool 18 and arranged to be unwound therefrom and wound onto the lower spool 19, is a ribbon 27 having indicated on one or both of its sides road maps, which consist, as shown, in graduating the ribbon to indicate miles and also indicating place identifications at points properly indicated by the distance graduations.

The left-hand edge of the door 12, at the sight opening, is also graduated to indicate miles. The graduations on both the ribbon and the door may be further divided to indicate tenths of miles. When both sides of the ribbon are used, the same road map may be indicated on both sides thereof only in reverse order, so that on the return trip it is only necessary to reverse the ribbon and spools in the casing. The intermediate portion of the ribbon 27 rests on the table 17 and is held thereby smooth and close to the sight opening, so that the same may be easily read.

To positively unwind the ribbon 27 from the upper spool 18 and draw the same over the tables 17, there is mounted in the casing 11, at the lower end of the table 17, a pair of laterally spaced wheels 28 having teeth 29 arranged to enter longitudinally spaced holes 30 at the edges of said ribbon. As shown, the wheels 28 are integrally formed and secured to a shaft 31 journaled in the sides of the casing 11. Keyed to the left-hand end of the shaft 31, outward of the casing 11, is a gear 32 which meshes with an idle gear 33 journaled on the respective sides of said casing and which, in turn, meshes with the gear 21, and thereby completes the driving connections between the shaft 31 and the lower spindle 17. Loosely journaled on the shaft 31, just outward of the gear 32, is a worn gear 34, and outward of this worm gear and having screw-threaded engagement with said shaft, is a thumb nut 35 by which the worm gear may be frictionally clamped against the gear 32, and thereby caused to rotate with the shaft 31. On the other end of the shaft 31, is a knob 36 by which said shaft may be turned in either direction, when the worm gear 34 is released from rotation therewith.

Meshing with the worm gear 34, is a worm 37 journaled in a bracket 38 secured to the casing 11. The worm 37 is driven by a flexible shaft 39, one end of which is attached thereto and the other end thereof is attached to a worm gear 40, which meshes with a worm 41 interposed in and forming a part of the flexible shaft 9. The flexible shaft 39 is mounted in a flexible casing 42 and the worm gear 40 and the worm 41 are mounted in a housing 43 interposed in the flexible casing 10 and to which said casing 42 is attached. A housing 44 is provided for the gears 21—32—33—34 and worm 37 and detachably secured to the casing 11 by screws.

On the back of the casing 11, is secured a U-shaped bracket 45 having a clamping screw 46 for securing said casing to an instrument board 47 or other support. This form of securing means, for the casing 11, is especially adapted for use in securing said casing to an oblique instrument board. For vertical instrument boards, a bracket, constructed to hold the instrument board in an oblique position, may be provided, in order that the ribbon may be more easily read.

In place of driving the worm gear 34 from the driving shaft of the speedometer, the same may be driven directly from one of the driven parts in the speedometer. When thus operating the road map, the same may be incorporated in and made a part of the speedometer.

To compensate for the varying diameter of the ribbon 27, as the same is wound thereon from the positive feeding device, to wit:—the wheels 28 and their toothed engagement with the ribbon, the spring fingers 23 will allow the gear 21 to slip on the spindle 19, or, in other words, move at a slower speed than said spindle. The ribbon 27 may be corrected, from time to time, in respect to the locations along the route, simply by operating the thumb nut 35 to release the worm gear 34, and thereby render the positive driving connections for the ribbon inoperative. With the worm gear 34 thus released, the ribbon may be moved in either direction by operating the knob 36 to turn the wheels 28.

To remove the ribbon 27 and spools 25 from the casing 11, the doors 12—14 and 15 are opened and one of the spools removed through the respective side door opening. This movement of one of the spools 25 will carry the ribbon edge with a slight lifting movement, off from the table 17 through the open top of the casing 11. Then by removing the other spool from its spindle, the ribbon may be completely removed from the casing. Both door openings normally closed by the doors 14 and 15 open into the open top of the casing 11.

What I claim is:—

The combination with a flexible power transmitting shaft provided at its extended end with a driving worm forming an element of said shaft, an instrument directly connected to and driven from said worm, a casing inclosing said worm, a worm gear mounted in said casing and meshing with said worm, a second flexible shaft connected to and driven directly from said worm, and a second instrument connected to and driven from said second flexible shaft.

In testimony whereof I affix my signature in presence of two witnesses.

MARION H. HARTER.

Witnesses:
CLARA DEMAREST,
BERNICE G. BAUMANN.